Nov. 4, 1947.   M. KATCHER   2,430,428
PRESSURE OPERATED SWITCH FOR HYDRAULIC BRAKE SYSTEMS
Filed Jan. 4, 1944   3 Sheets-Sheet 1
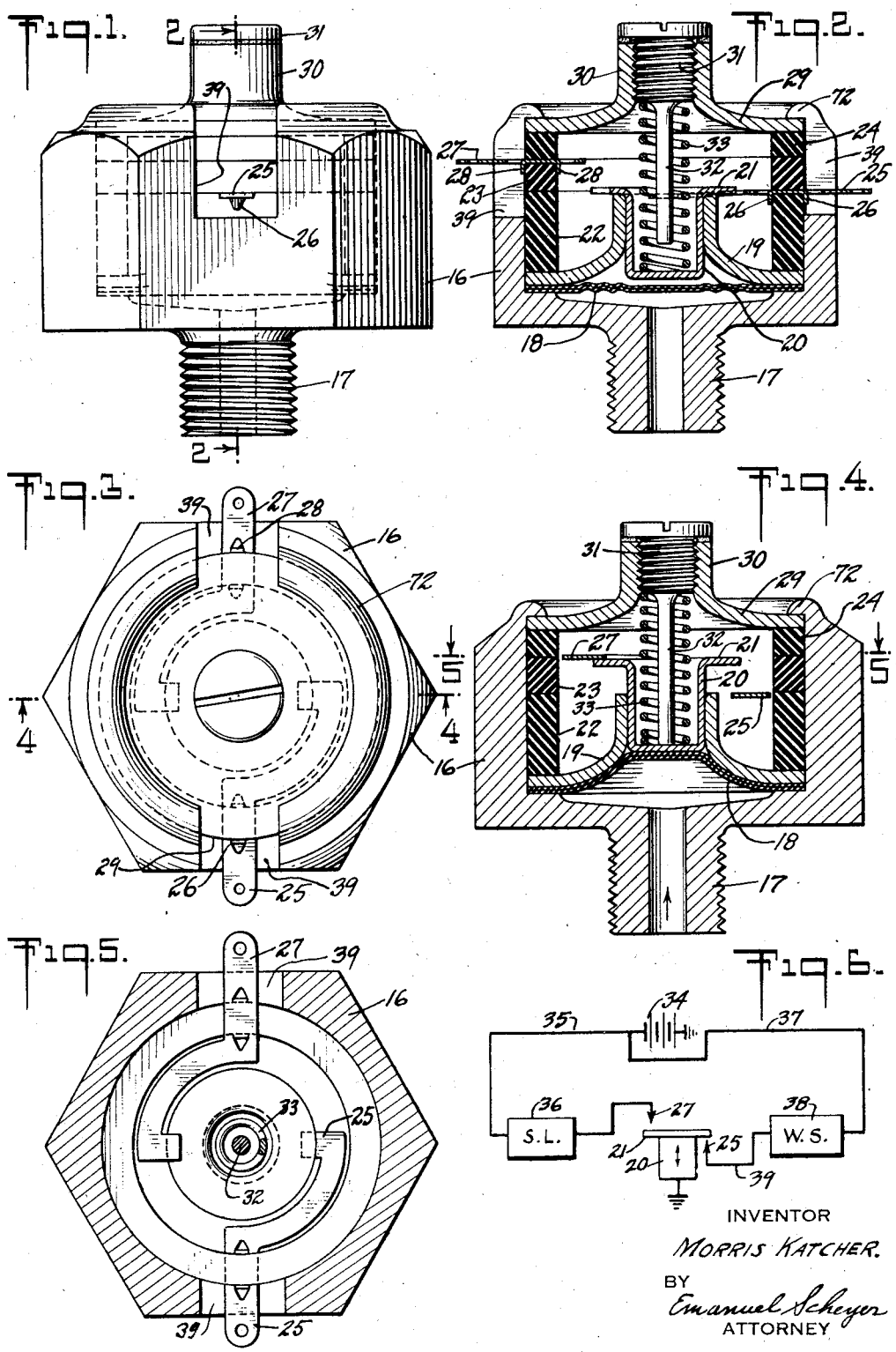
INVENTOR
*Morris Katcher.*
BY
*Emanuel Scheyer*
ATTORNEY Nov. 4, 1947.    M. KATCHER    2,430,428
PRESSURE OPERATED SWITCH FOR HYDRAULIC BRAKE SYSTEMS
Filed Jan. 4, 1944    3 Sheets-Sheet 2
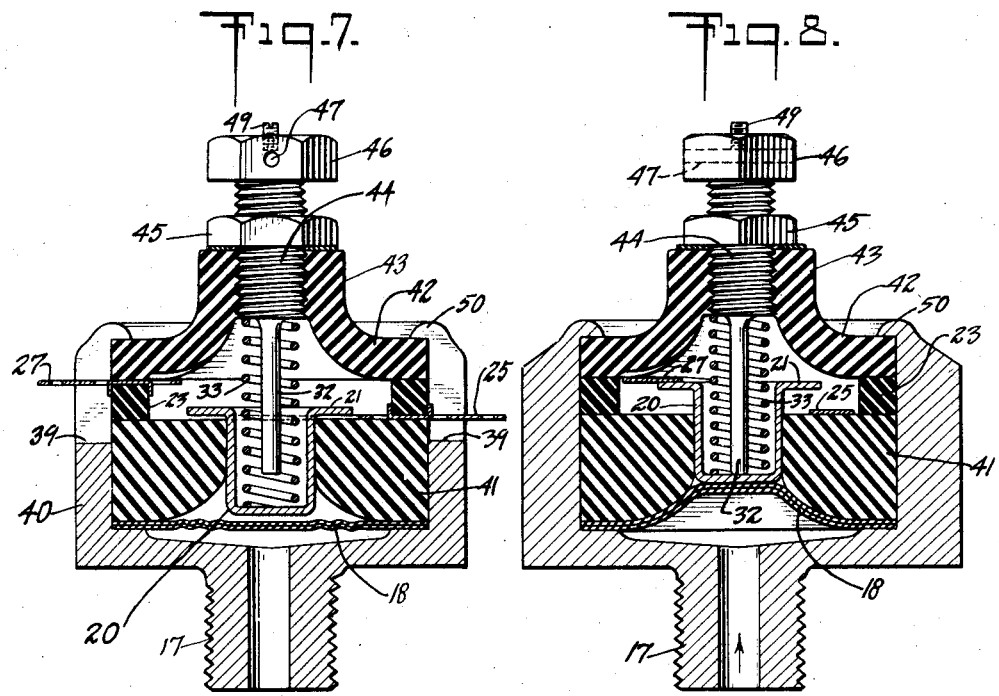
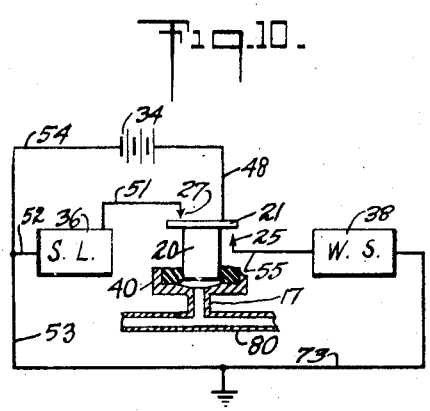
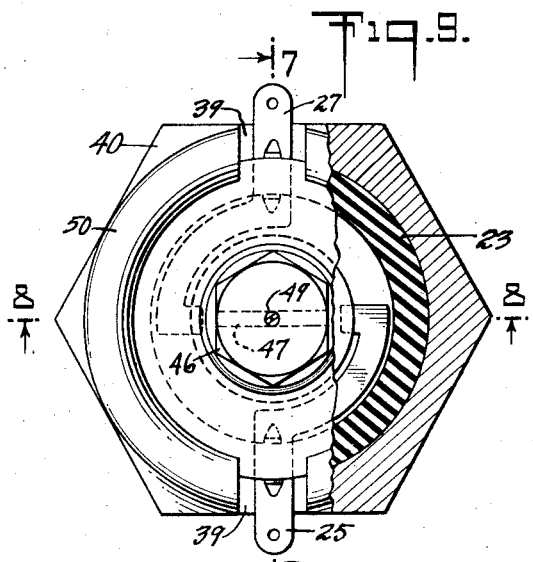
INVENTOR
MORRIS KATCHER.
BY
Emanuel Scheyer
ATTORNEY

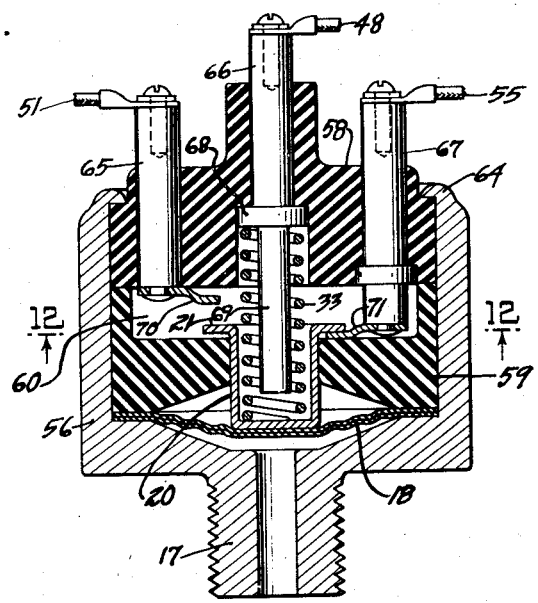
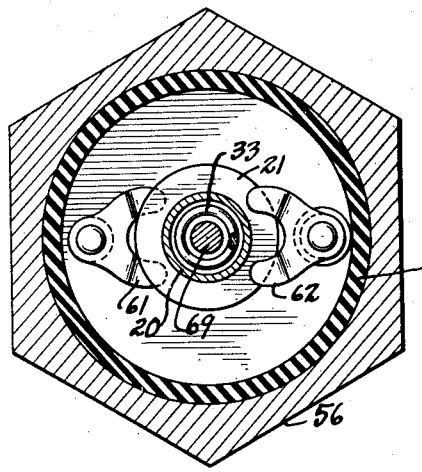
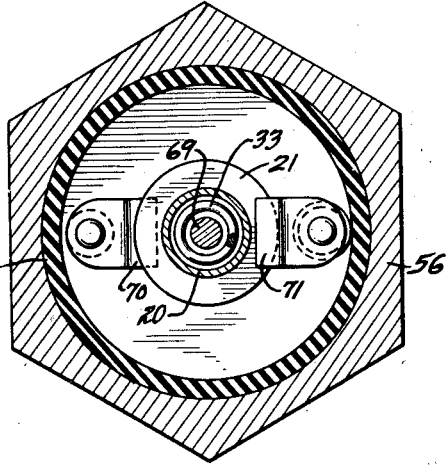

Patented Nov. 4, 1947

2,430,428

UNITED STATES PATENT OFFICE 2,430,428

PRESSURE OPERATED SWITCH FOR HYDRAULIC BRAKE SYSTEMS

Morris Katcher, New York, N. Y.

Application January 4, 1944, Serial No. 516,920

12 Claims. (Cl. 200—83)

This invention relates generally to pressure operated switches, and more particularly to switches of this character adapted to be operated by pressure changes in the fluid pressure or hydraulic brake systems of motor vehicles.

The invention further relates to a hydraulic brake system which operates a stop light when the brakes are applied, and when there is loss of pressure in the system beyond a predetermined minimum, said system operates a warning signal.

It is usual in motor vehicles to operate a stop light when the brakes are applied, but of course it will be understood by those skilled in the art, that other types of signal can be operated and accordingly the term stop light as used herein is intended to have this broader meaning.

It is essential for the safe operation of the brake system that the pressure in it be above a predetermined minimum. A positive pressure must be maintained, which while only small, say three or four pounds per square inch, is sufficient to keep air out of the system. Further, the advantage of maintaining a positive pressure is that should there be a leakage of brake fluid, such pressure would be lost. The loss in pressure operates the switch or other means which in turn effects the operation of a visual or audible alarm.

It is an object of the present invention to use the same pressure switch or other means which operates the alarm when the pressure falls too low, to operate the stop light based on the high pressure developed in the hydraulic brake system when the brakes are applied. In other words, where a pressure switch is used, it controls electric circuits so that the alarm is actuated when the pressure in the system falls below a predetermined amount, and the stop light goes on when the pressure in the system exceeds a predetermined amount.

Because the switch must be very delicate and sensitive to register a drop in pressure of only a few pounds, it must have special protection when the brakes are jammed on and the pressure rises to several hundred pounds per square inch. This protection is provided by means of a sturdy stop against which part of the movable contact abuts when the pressure exceeds a predetermined amount, the abutting taking place during contact with the stop light terminal of the switch.

Other objects and advantages will become apparent upon further study of the description and drawings, in which:

Fig. 1 is an elevation of one form of the pressure switch.

Fig. 2 is a section taken along the line 2—2 of Fig. 1 showing conditions when all pressure is lost.

Fig. 3 is a top plan of the switch of Fig. 1.

Fig. 4 is a section taken along the line 4—4 of Fig. 3 showing conditions when there is braking or high pressure in the hydraulic brake system. The section is taken at right angles to that shown in Fig. 2.

Fig. 5 is a section taken along the line 5—5 of Fig. 4.

Fig. 6 is a wiring diagram showing the hook-up of the switch in a hydraulic brake system for operating both a stop light and a warning signal.

Fig. 7 is a section through another form of pressure switch taken along the line 7—7 of Fig. 9 showing conditions when all pressure is lost.

Fig. 8 is a section taken along the line 8—8 of Fig. 9 showing conditions where there is braking or high pressure in the hydraulic brake system.

Fig. 9 is a partial plan and sectional plan view of the switch.

Fig. 10 is a wiring diagram showing the hook-up of the second form of switch in a hydraulic brake system for operating both a stop light and a warning signal. The connection for the transmission of fluid pressure to the switch from the main distributing tube of the hydraulic system is shown, a fargment only of the tube and switch being shown.

Fig. 11 is a modification of the pressure switch shown in Fig. 7. It is my preferred form.

Fig. 12 is a section taken along the line 12—12 of Fig. 11, and

Fig. 13 is a section taken similarly to Fig. 12 but showing still another modification of the switch.

Referring to Figs. 1-6, casing 16 is in the form of a hollow hexagonal nut with a hollow externally threaded boss 17. Boss 17 is screwed into the source of pressure, not shown, as into a hydraulic brake system, so that flexible diaphragm 18 responds to the pressure in the system. Inside of casing 16 is mounted annular guide 19, the lower portion of which presses on the top of diaphragm 18 at its edges. Movable contact 20 is in the form of a sleeve or hollow shell closed at the bottom and open at the top. The upper portion of guide 19 is cylindrical and slidably supports movable contact 20. Flange 21 extends radially outward from the top of contact 20 and limits the downward motion of the latter when said flange contacts the top of guide 19. The inside surface of casing 16 is cylindrical so that cylindrical sleeve 22 of insulating material fits nicely therein. Above sleeve 22 is another insulating sleeve 23 and above that is still another insulating sleeve 24. Between sleeves 22 and 23 is mounted the low pressure spring terminal 25, tabs 26 being stamped out therefrom for gripping sleeve 22 to hold said terminal more firmly in position. Between sleeves 23 and 24 is mounted the high pressure terminal 27, tabs 28 being stamped out therefrom for gripping sleeve 23 to hold said terminal more firmly in position. Casing 16 is notched out at places 39 to allow terminals 25 and 27 to come through. Set on top of insulating sleeve 24 is a cover or cap 29, said cap having an internally threaded hollow boss 30 extending upwardly therefrom. Cap 29, sleeves 22, 23 and 24, guide 19 and diaphragm 18 are all firmly held in casing 16 by having the upper edge 72 thereof swedged or peened over the rim of cap 29. Threaded plug 31 is screwed into boss 30, a stop pin 32 integral with said plug, extending downwardly therefrom into the interior of contact 20. A compression spring 33 is set over pin 32, said spring reacting at its upper end against plug 31 and at its lower end against the inside face of the bottom of contact 20. Contact 20 is electrically grounded through casing 16.

When the pressure in the hydraulic system is normal and the brakes are not acting, a slight pressure is present. This keeps flexible diaphragm 18 somewhat up from its position shown in Fig. 2 with contact 20 in such position that its flange 21 is at some intermediate location in the space between the free ends of terminals 25 and 27 without touching either of them. When the brakes are on, there is very high pressure in the system, causing diaphragm 18 to force up contact 20 with a slam against the pressure of spring 33 which is relatively light. But no damage is done because pin 32 takes the shock and limits the upward motion of said contact. In the upper position of contact 20, its flange 21 engages the free end of high pressure terminal 27, which as will be explained effects the energization of the stop light. Engagement between the top of guide 19 and flange 21 limits the downward motion of contact 20. This lower limit is reached when the system loses its pressure, as when a leak causes loss of brake fluid. At the lower limit, flange 21 contacts the free end of terminal 25 causing a warning signal to be energized to indicate that the system is not functioning.

As was explained, when the brakes are on, flange 21 contacts terminal 27, and as can be seen in Fig. 6, when this occurs, the current passes from battery 34, which is grounded, through wire 35 through stop light 36 to terminal 27, to flange 21 and contact 20 back to the ground. When the braking system is not being used and the normal slight pressure is present, since flange 21 is out of contact with both terminals 25 and 27, no current flows through battery 34. However, when there is a loss of pressure, as from a leak, the current passes from battery 34, through wire 37, through warning signal 38, wire 39, terminal 25, flange 21, contact 20, back to ground. The warning signal may be a visual or audible one. When the brakes are applied, it is usual to energize a stop light, but of course other forms of signal could be used.

The switch of Figs. 7–10 differs from the one just described, among other things, in that its movable pressure actuated contact 20 is not grounded through its casing 40, while stop light 36 and warning signal 38 are grounded. Inside casing 40 is set insulating sleeve 41, between the bottom of which and said casing is pinched the edge of flexible diaphragm 18. Sleeve 41 also functions as a guide for contact 20 which is slidable up and down therein. Insulating sleeve 23 is set above sleeve 41, said sleeves holding between them low pressure (actually zero pressure) terminal 25. Above sleeve 23 is set insulating sleeve 42, the latter acting also as the cover or cap of the switch. Sleeve 42 is provided with an internally threaded upwardly extending boss 43 in which is mounted a screw plug 44. Lock nut 45 retains plug 44 in position in boss 43. A terminal nut 46 is screwed to the top of plug 44. Nut 46 has a hole 47 therein for the insertion of the end of wire 48, Fig. 10. Set screw 49 will maintain in place in hole 47 wire 48 when set therein. Diaphragm 18 and sleeves 41, 23 and 42 are firmly held in casing 40 by the swedging or peening over of the upper edge of said casing to form the flange 50. Notches 39 are provided in casing 40 to allow the outward extension of terminals 25 and 27, which are held between sleeves 41 and 23, and 23 and 42, respectively. Plug 44 is provided with a stop pin 32 about which is set helical spring 33, the latter normally holding down movable contact 20 in its lowest position as explained heretofore.

Boss 17, on the bottom of casing 40, is screwed into the main distributing tube 80 of the hydraulic brake system, Fig. 10. Tube 80 is the one which connects the master cylinder of the system, not shown, with the brake motors at the wheels, also not shown. Only a fragment of the hydraulic brake system is shown, as explained, but the system is well known to those skilled in the art.

When the brakes are applied, flange 21 engages terminal 27 causing the current from battery 34, Fig. 10, to flow through wire 48, plug 44, contact 20, flange 21, terminal 27, wire 51, through stop light 36 and wires 52 and 53 to ground. The other terminal of battery 34 is shown as grounded through wires 54 and 53. In actual practice, wire 54 is not joined to wire 52, but each is independently grounded. With flange 21 out of contact with terminals 25 and 27, neither stop light 36 nor warning signal 38 are operated. This is the normal condition for the hydraulic brake system when the brakes are not applied, a small pressure being present in the system. When the pressure in the system drops to zero, as would be the case if a leak developed, spring 33 pushes contact 20 down so that its flange 21 engages terminal 25. Current from one terminal of battery 34 then passes through wire 48, plug 44, contact 20, flange 21, terminal 25, wire 55, through warning signal 38, wire 73 to ground. The other terminal of battery 34 is grounded as noted above.

The switch shown in Figs. 11–13 is my preferred form. It is a modification of the switch shown in Figs. 7–9, the principal modification being that instead of having the high pressure and low pressure terminals come out the side of the casing, they come out through the insulating cap 58 at the top. This is more convenient for making the connections and also results in a sturdier construction.

Boss 17 on casing 56 has the same function as boss 17 on casing 40, Fig. 7. Inside casing 56 is set insulating sleeve 59, between the bottom of which and said casing is pinched the edge of flexible diaphragm 18. Sleeve 59 also functions as a guide for contact 20 which is slidable up and down therein. The upper portion of sleeve 59 is recessed to provide a space 60 for the up and down play of contact 20 with its flange 21. Space 60 also provides room for high pressure terminal 70 and low pressure terminal 71, Figs. 11 and 13, the latter functioning actually when the pressure approaches or reaches zero. Insulating cap 58 fits inside casing 56 above sleeve 59. Diaphragm 18, sleeve 59 and cap 58 are held tightly in casing 56 when the upper edge of the latter is swedged or peened over to form flange 64. Cap 58 has pins 65, 66 and 67 moulded therein. The lower end of pin 65 has terminal 70 connected to it while its upper end is connected to wire 51, Fig. 10. The upper end of pin 66 has wire 48 connected to it. The upper end of pin 67 has wire 55 attached to it while its lower end carries terminal 71. The current from wire 48 is transmitted through pin 66 to contact 20 by way of spring 33, said spring normally holding contact 20 in its lowest position. Pin 66 is provided with a collar 68 and an extension 69 which take up the shock and stop contact 20 when it is slammed upward by the great increase in pressure created under diaphragm 18 when the brakes are applied. As explained in connection with the switch of Figs. 7–10, when the brakes are applied, contact 20 engages terminal 70, operating stop light 36. When the pressure in the system becomes too low or drops to zero, contact 20 engages terminal 71, operating warning signal 38. With the normal operating pressure in the system, when the brakes are not applied, contact 20, or rather its flange 21, engages neither terminal 70 nor 71.

In Fig. 12, which is a section through Fig. 11 taken the same as Fig. 13 but through a slightly modified switch, everything is the same as in Fig. 13 except instead of using solid terminals as terminals 70 and 71, bifurcated ones as terminals 61 and 62 are used.

In both the switch of Fig. 7 and that of Fig. 11, the casing has mounted in it an insulating box in whose interior are the terminals and a portion of the movable contact for controlling the current through said terminals.

The directions as given herein, such as up or down, or upper or lower, are merely relative for convenience of definition and are therefore not to be considered as absolute.

While the description and drawing relate to a switch for operating a stop light and warning signal, I wish it to be understood that it is not intended to limit the invention to such, but to cover, in a broad sense a switch for the operation of a device when the pressure in the switch is increased beyond a predetermined amount, for the operation of a device when the pressure falls below a predetermined minimum and to operate no device when there is a predetermined normal pressure in the switch.

I claim:

1. For use in a hydraulic brake system of a motor vehicle, a pressure operated switch comprising a casing, the lower part of the casing having a passage through it leading to the interior of the casing, a flexible diaphragm mounted inside the casing extending across and sealing the passage blocking the flow of fluid from the system, when the switch is mounted to place said passage in communication with the fluid in said system, contact means movably mounted in the casing above the diaphragm for up and down motion, a pair of terminals insulatively mounted in the casing in spaced relation and insulated from each other, one terminal being higher than the other, the upper terminal having a yieldable portion extending into the interior of the casing, said contact means having a portion adapted to reciprocate between said terminals into contact with the lower terminal and the yieldable portion of the upper terminal, means yieldingly holding the contact means down against the diaphragm and normally maintaining said portion between said terminals out of contact with either when there is a predetermined normal light pressure in the system, the greatly increased pressure in the system when the brakes are applied, pushing up the diaphragm against said contact means and slamming said portion into contact with the upper terminal, said holding means pushing down the contact means, bringing said portion into contact with the lower terminal, when the pressure in the system falls below a predetermined minimum, and stop means fixed inside the casing normally out of contact with the contact means for taking the force of the shock from the upper terminal by having the contact means impinge against it when the contact means is slammed upward by the increase in pressure in the system induced by the application of the brakes.

2. For use in a hydraulic brake system of a motor vehicle, a pressure operated switch comprising a casing, the lower part of the casing having a passage through it leading to the interior of the casing, a flexible diaphragm inside the casing sealing off the passage and blocking the flow of fluid from the hydraulic brake system when the switch is mounted to place said passage in communication with the fluid in said system, contact means slidably mounted in the casing above the diaphragm for up and down motion with the latter, said contact means being in the form of a hollow shell open at the top and closed at the bottom, a pair of terminals insulatively mounted in the casing in spaced relation and insulated from each other, one terminal being higher than the other, the upper terminal having a yieldable portion extending into the interior of the casing, said contact means having a portion adapted to reciprocate between said terminals into contact with the lower terminal and the yieldable portion of the upper terminal, a relatively light spring extending inside the shell and bearing down on the top of its closed bottom holding the contact means down against the diaphragm and normally maintaining said portion between said terminals out of contact with either when there is a predetermined normal light pressure in the system, the greatly increased pressure in the system when the brakes are applied, pushing up the diaphragm and forcing said portion into contact with the upper terminal, said spring pushing down the contact means, bringing said portion into contact with the lower terminal when the pressure in the system falls below a predetermined minimum, and stop means fixed inside the casing and projecting into the hollow interior of the contact means engaging the top of the closed bottom of the latter for taking the force of the shock from the upper terminal and said portion when the contact means is forced upward by the increase in pressure in the system induced by the application of the brakes.

3. For use in a hydraulic brake system of a motor vehicle, a pressure operated switch comprising a casing, the lower part of the casing having a passage through it leading to the interior of the casing, a flexible diaphragm inside the casing sealing off the passage, blocking the flow of fluid from said system when the switch is mounted to place said passage in communication with the fluid in said system, a contact sleeve slidably mounted in the casing above the diaphragm for up and down motion with the latter, said sleeve being open at the top, closed at the bottom and with an outwardly flaring flange at its top, a pair of terminals insulatively mounted in the casing with their free ends in spaced relation, said terminals, being insulated from each other, one end being higher than the other, said flange adapted to reciprocate between said ends into contact with them, a relatively light spring extending inside the sleeve and bearing down on the top of its closed bottom, holding the latter down against the diaphragm and normally maintaining said flange between the terminals out of contact with either when there is normal light pressure in the system, the greatly increased pressure in the system when the brakes are applied, pushing up the diaphragm and forcing the flange into contact with the upper terminal, said spring pushing down the sleeve, bringing the flange into contact with the lower terminal when the pressure in the system falls below a predetermined minimum.

4. For use in a hydraulic brake system of a motor vehicle, a pressure operated switch comprising a casing with a cover portion, the lower part of the casing having a passage through it leading to the interior of the casing, a flexible diaphragm inside the casing sealing off the passage, blocking the flow of fluid from said system when the switch is mounted to place the passage in communication with the fluid in said system, a contact sleeve slidably mounted in the casing above the diaphragm for up and down motion with the latter, said sleeve being open at the top and closed at the bottom, a pair of terminals insulatively mounted in the casing with their free ends in spaced relation, said terminals being insulated from each other, one end being higher than the other, said sleeve having a portion adapted to reciprocate between said ends into contact with them, a relatively light helical spring extending inside the sleeve and bearing down on the top of its closed bottom holding the sleeve down against the diaphragm and normally maintaining said portion between the terminals out of contact with either when there is normal light pressure in the system, the greatly increased pressure in the system when the brakes are applied, pushing up the diaphragm and forcing said portion into contact with the upper terminal, said spring pushing down the sleeve, bringing said portion into contact with the lower terminal when the pressure in the system falls below a predetermined minimum, and stop means fastened to the cover and projecting down into the sleeve, engaging the closed bottom of the latter for taking the force of the shock from the upper terminal when the sleeve is forced upward by the increase in pressure in the system induced by the application of the brakes, said helical spring encircling the stop means.

5. For use in a hydraulic brake system of a motor vehicle, a pressure operated switch comprising a casing with a cover, the lower part of the casing having a passage through it leading to the interior of the casing, a flexible diaphragm inside the casing sealing off the passage, blocking the flow of fluid from said system when the switch is mounted to place said passage in communication with the fluid in said system, contact means movably mounted in the interior of the casing above the diaphragm for up and down motion, three terminals mounted in the casing in spaced relation and insulated from each other, at least one of the terminals being mounted in the cover, the three terminals projecting into the interior of the casing, the free end of one of the terminals being higher than the free end of another terminal, the third terminal being in electrical connection with the contact means irrespective of the position of the latter, said contact means having a portion adapted to reciprocate between said ends into contact with them, means yieldingly holding the contact means down against the diaphragm and normally maintaining said portion between said ends out of contact with either when there is a predetermined normal light pressure in the system, the greatly increased pressure in the system when the brakes are applied, pushing up the diaphragm and forcing said portion into contact with the higher free end, connecting its terminal with said third terminal, said holding means pushing down the contact means, bringing said portion into contact with the lower free end, connecting its terminal with said third terminal when the pressure in the system falls below a predetermined minimum.

6. For use in a hydraulic brake system of a motor vehicle, a pressure operated switch comprising a casing with a cover, the lower part of the casing having a passage through it leading to the interior of the casing, a flexible diaphragm inside the casing sealing off the passage, blocking the flow of fluid from said system when the switch is mounted to place said passage in communication with the fluid in said system, a contact sleeve slidably mounted in the casing above the diaphragm for up and down motion with the latter, said sleeve being open at the top and closed at the bottom, three terminals mounted in the casing in spaced relation and insulated from each other, at least one of the terminals being mounted in the cover, two of them projecting into the interior of the casing with the free end of one of the latter terminals higher than the free end of the other and a relatively light spring extending inside the sleeve and having its lower end bear down on the closed bottom of the sleeve, the upper end of the spring bearing up against the third terminal providing an electrical connection with the third terminal for all positions of the sleeve, the upper portion of the sleeve adapted to reciprocate between said terminal free ends into contact with them, said spring normally maintaining said portion between said latter ends out of contact with either when there is normal light pressure in the system, the greatly increased pressure in the system when the brakes are applied, pushing up the diaphragm and forcing said portion into contact with the higher terminal free end, connecting its terminal with said third terminal, said spring pushing down the sleeve, bringing said portion into contact with the lower terminal free end connecting its terminal with said third terminal when the pressure in the system falls below a predetermined minimum.

7. For use in a hydraulic brake system of a motor vehicle, a pressure operated switch comprising a casing with a cover, the lower part of the casing having a passage through it leading to the interior of the casing, a flexible diaphragm inside the casing sealing off the passage, blocking the flow of fluid from said system when the switch is mounted to place said passage in communication with the fluid in said system, contact means movably mounted in the casing above the diaphragm for up and down motion, three terminals mounted in the casing in spaced relation and insulated from each other, at least one of the terminals being mounted in the cover, two of them having free ends projecting into the interior of the casing, one of said free ends being higher than the other, the third terminal being in electrical connection with the contact means irrespective of the position of the latter, said contact means having a portion adapted to reciprocate between said free ends into contact with them, means yieldingly holding the contact means down against the diaphragm and normally maintaining said portion between said free ends out of contact with either when there is normal light pressure in the system, the greatly increased pressure in the system when the brakes are applied, pushing up the diaphragm and forcing said portion into contact with the higher free end, connecting the terminal of the latter with said third terminal, said holding means pushing down the contact means, bringing said portion into contact with the lower free end, connecting its terminal with said third terminal when the pressure in the system falls below a predetermined minimum, said third terminal having a portion projecting down into the interior of the casing acting as a stop engaging the contact means for taking the force of the shock from the higher free end when the contact means is forced upward by the increase in pressure induced in the system by the application of the brakes.

8. For use in a hydraulic brake system of a motor vehicle, a pressure operated switch comprising a casing with a cover of insulative material, the lower part of the casing having a passage through it leading to the interior of the casing, a flexible diaphragm inside the casing sealing off the passage, blocking the flow of fluid from said system when the switch is mounted to place said passage in communication with the fluid in said system, a contact sleeve slidably mounted in the casing above the diaphragm for up and down motion with the latter, said sleeve being open at the top and closed at the bottom, three terminals mounted in the cover in spaced relation, two of them having free ends projecting into the interior of the casing, one of said free ends being higher than the other, the third terminal extending downward into the casing and into the sleeve, said latter terminal being provided with a collar just inside of the cover, and a relatively light helical spring encircling the lower end of the third terminal extending inside of the sleeve with its lower end bearing down on the closed bottom of the sleeve, the upper end of the spring bearing up against said collar providing an electrical connection between the third terminal and the sleeve for all positions of the latter, the upper portion of the sleeve being adapted to reciprocate between said terminal free ends into contact with them, said spring normally maintaining said portion between said latter ends out of contact with either when there is normal light pressure in the system, the greatly increased pressure in the system when the brakes are applied, pushing up the diaphragm and forcing said portion into contact with the higher terminal free end, connecting its terminal with said third terminal, said spring pushing down the sleeve, bringing said portion into contact with the lower terminal free end connecting its terminal with said third terminal when the pressure in the system falls below a predetermined minimum, the portion of the third terminal projecting into the sleeve acting as a stop, engaging the closed bottom of the sleeve for taking the force of the shock from the higher terminal free end when the sleeve is forced upward by the increase in pressure induced in the system by the application of the brakes.

9. For use in a hydraulic brake system of a motor vehicle, a pressure operated switch comprising a casing with a passage through it leading to the interior of the casing, a flexible diaphragm inside the casing extending across the passage for blocking off the flow of fluid from the hydraulic brake system when the switch is mounted to place said passage in communication with the fluid in said system, a contact movably mounted in the casing for a reciprocating motion with the diaphragm, a pair of terminals insulatively mounted in the casing in spaced relation to each other and insulated from each other, said contact adapted to reciprocate between the terminals into contact with one or the other of them, a relatively light spring holding the contact against the diaphragm and normally maintaining said contact between said terminals out of contact with either when there is normal light pressure in the system, the maximum pressure developed by said spring against the contact being above that induced against the contact by said normal light pressure, while the minimum pressure exertable by said spring against the contact is less than said normal light pressure, the greatly increased pressure in the system when the brakes are applied, pushing the diaphragm inward of the casing and forcing said contact into contact with one of said terminals, said spring pushing the contact into contact with the other terminal, when the pressure in the system falls below said light normal pressure.

10. For use in a hydraulic brake system of a motor vehicle, a pressure operated switch comprising a casing with a passage through it leading to the interior of the casing, a flexible diaphragm inside the casing extending across the passage for blocking off the flow of the fluid from the hydraulic brake system when the switch is mounted to place said passage in communication with the fluid in said system, a contact movably mounted in the casing for a reciprocating motion with the diaphragm, said contact adapted to be connected in a circuit and remain connected therein irrespective of its position in the casing, a pair of terminals insulatively mounted inside the casing in spaced relation to each other, said terminals being insulated from each other, said contacts adapted to reciprocate between the terminals into contact with one or the other of them, means yieldingly pressing the contact against the diaphragm and holding said contact between said terminals out of contact with either of them when there is a predetermined normal light pressure in the system, the greatly increased pressure in the system when the brakes are applied, pushing the diaphragm against the contact moving the latter into contact with one of the terminals, said means pushing the contact against the other terminal when the pressure in the system falls below said predetermined normal light pressure.

11. A pressure operated switch as claimed in claim 10 in which the casing is adapted to be grounded and the contact is in electrical connection with the casing irrespective of the position of the contact in the casing.

12. A pressure operated switch as claimed in claim 10 having a stop in fixed position inside of the casing, said stop being out of touch with the contact when the latter is maintained between the terminals out of contact with either, but taking the force of the shock from the terminal contacted by the movable contact due to the increase in pressure in the system induced by the application of the brakes.

MORRIS KATCHER.

REFERENCES CITED

The following references are of record in the file of this patent:

UNITED STATES PATENTS

| Number | Name | Date |
|---|---|---|
| 1,850,626 | Hukill | Mar. 22, 1931 |
| 1,946,759 | Preston et al. | Feb. 13, 1934 |
| 1,951,882 | Pentecost | Mar. 20, 1934 |
| 2,134,902 | White | Nov. 1, 1938 |
| 2,164,821 | Katcher | July 4, 1939 |
| 2,191,381 | Hanson | Feb. 20, 1940 |
| 2,332,301 | Cox | Oct. 19, 1943 |
| 775,165 | Coffield | Nov. 15, 1904 |
| 1,408,221 | Pendergast | Feb. 28, 1922 |